United States Patent [19]
Gregory et al.

[11] Patent Number: 5,464,492
[45] Date of Patent: Nov. 7, 1995

[54] METHOD FOR MANUFACTORING A PORTABLE LIQUID SPILL CONTAINMENT SYSTEM

[75] Inventors: David B. Gregory, Kawkawlin; Dan A. Oliver, West Branch, both of Mich.

[73] Assignee: Renew Roof Technologies Inc., Bay City, Mich.

[21] Appl. No.: 247,137

[22] Filed: May 20, 1994

[51] Int. Cl.$^6$ ........................................... B32B 31/00
[52] U.S. Cl. ................. 156/246; 156/280; 156/289; 156/242; 156/249
[58] Field of Search .................... 156/242, 246, 156/249, 278, 280, 289; 220/415, 417, 454, 457, 461, 573, 666, 678, 437, 439, 627; 4/585, 488; 184/106

[56] References Cited

U.S. PATENT DOCUMENTS

| | | | |
|---|---|---|---|
| 2,440,965 | 5/1948 | Merrill et al. | 220/457 |
| 3,661,227 | 5/1972 | Robel et al. | 220/417 |
| 3,847,716 | 11/1974 | Dorsch | 220/457 |
| 4,183,984 | 1/1980 | Bowers et al. | 428/81 |
| 4,245,055 | 1/1981 | Smith | 521/140 |
| 4,580,372 | 5/1986 | Osborn | 52/3 |
| 4,671,024 | 6/1987 | Schumacher | 52/2 |
| 4,916,939 | 4/1990 | Mögel | 220/457 |
| 5,090,588 | 2/1992 | Van Romer et al. | 220/666 |
| 5,128,189 | 7/1992 | Bartlett | 184/106 |

*Primary Examiner*—Michael W. Ball
*Assistant Examiner*—Richard Crispino
*Attorney, Agent, or Firm*—Learman & McCulloch

[57] ABSTRACT

A portable liquid spill containment has a composite base sheet that is formed by spraying a base layer of curable elastomeric polymer compound onto a non-adherent transfer surface. Before the compound cures, a sheet of woven reinforcement fabric is applied to the base layer. An endless tubular containment wall is mounted on the base sheet adjacent its perimeter to isolate a containment area. The containment wall is fabricated of elastic, closed-cell foam which has a memory that enables the material to recover its shape fully after each of repeated deformations. A final top skin layer of the curable elastomeric polymer compound is applied to the base sheet and containment wall to unite them and to develop a liquid-impervious, seamless membrane or cover extending from the containment area up and around the containment wall. In use, the containment is positioned in an area where liquid to be contained is being handled. Wheeled vehicles, such as fuel delivery trucks, may enter the containment area simply by driving over the resiliently deformable containment wall. Any spills are contained within the confines of the containment wall. Prior to the vehicles exiting over the containment wall, the spilled liquid is removed.

19 Claims, 3 Drawing Sheets

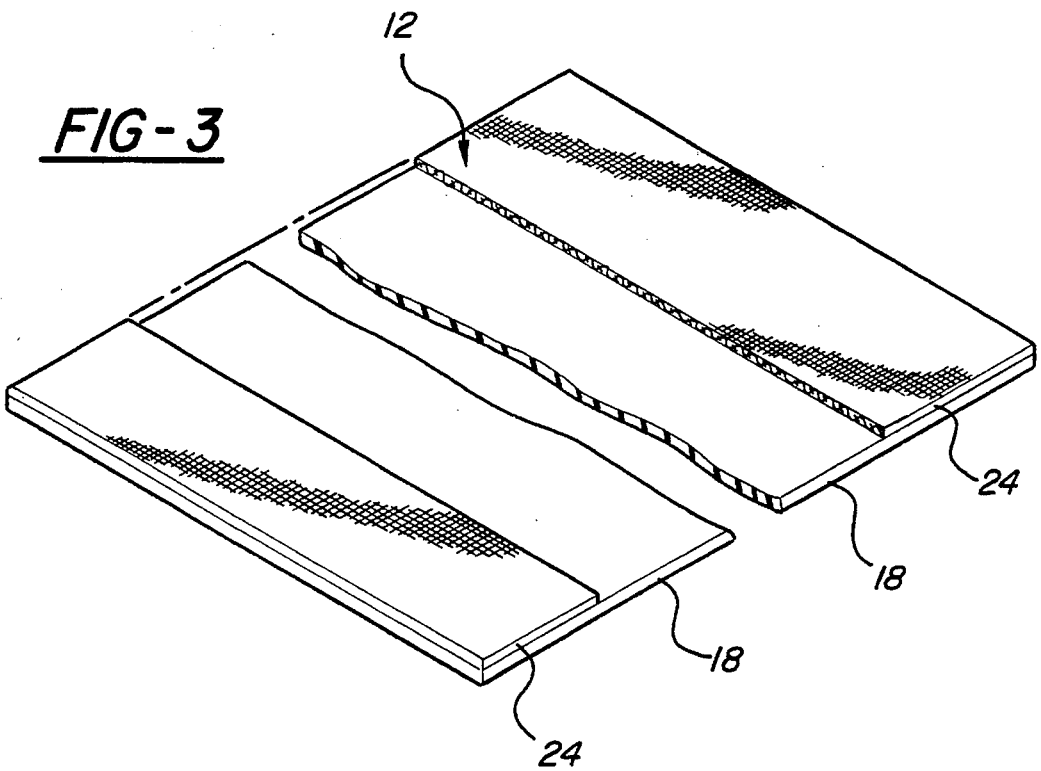
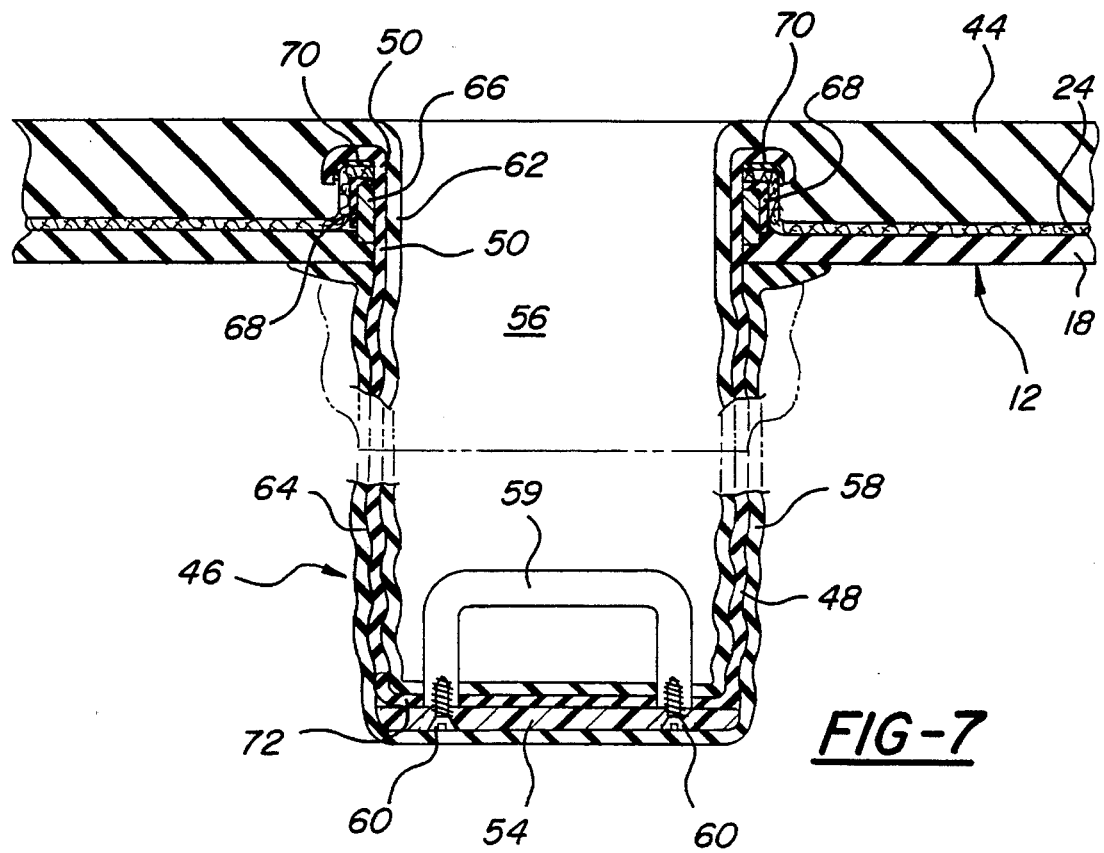

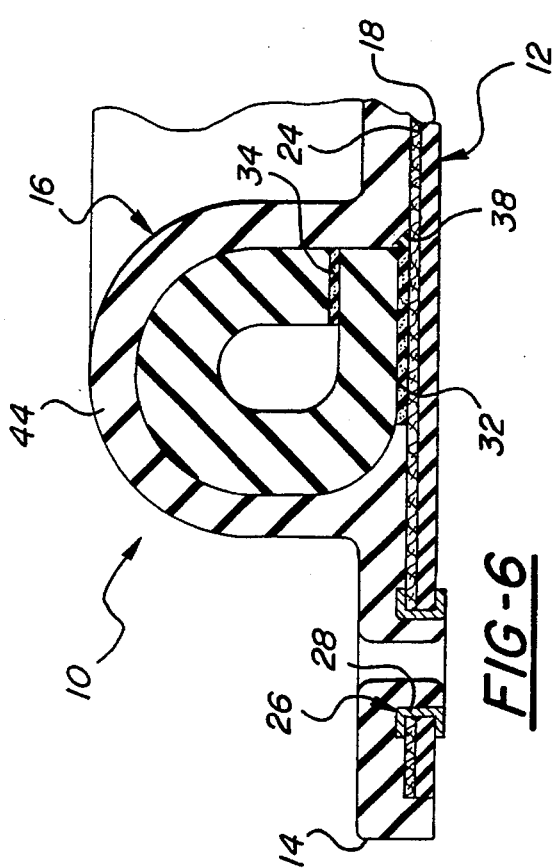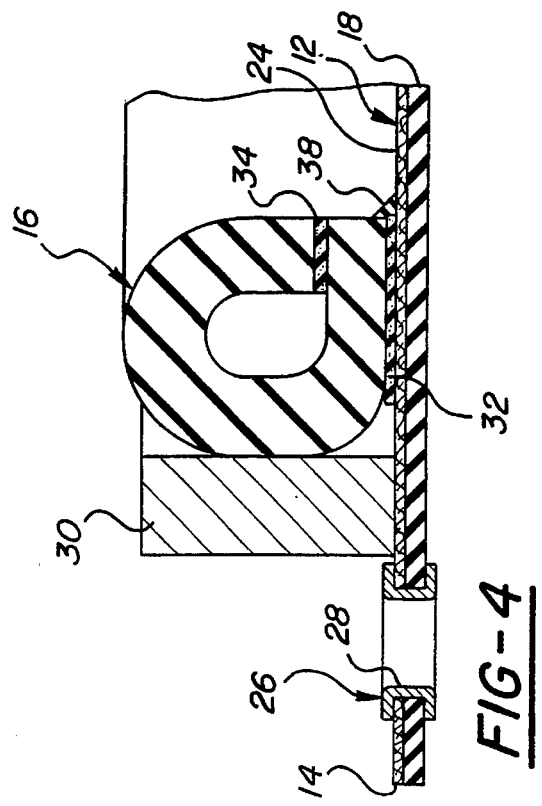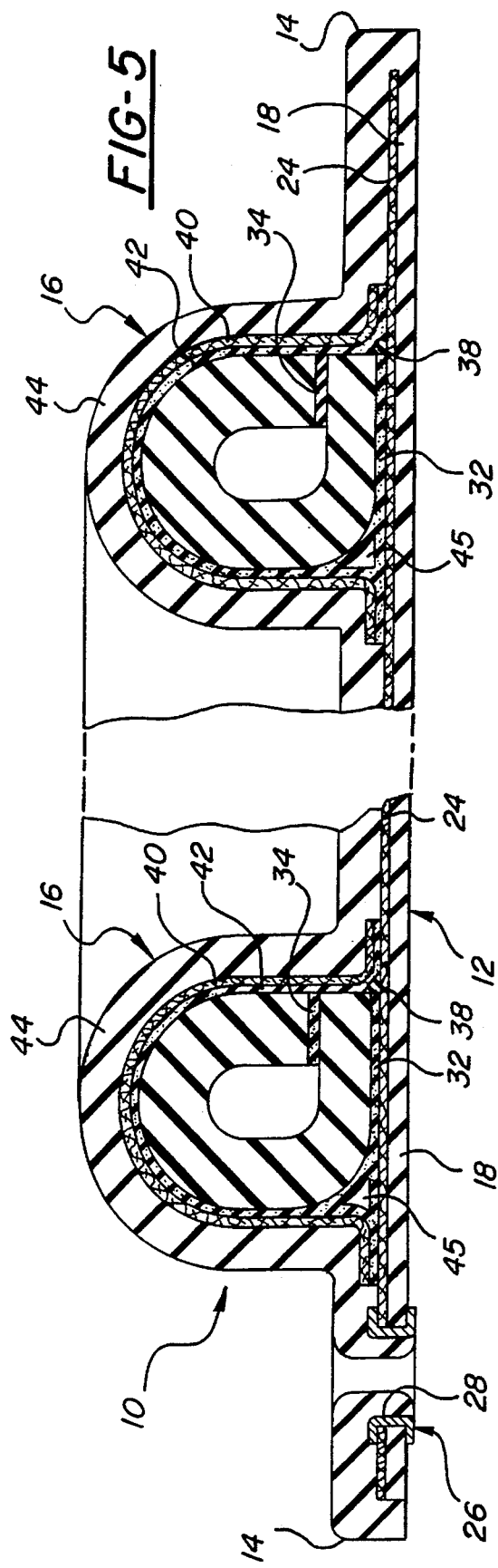

METHOD FOR MANUFACTORING A PORTABLE LIQUID SPILL CONTAINMENT SYSTEM

This invention relates to liquid spill containment systems and particularly to a portable containment system and its method of manufacture and use.

BACKGROUND OF THE INVENTION

Non-portable liquid spill containment systems are known for use in tank farm environments, for example, in which a number of storage tanks containing environmentally hazardous liquids, such as petroleum fuel products, are accommodated within a spill containment area bounded by an upstanding perimetrical dike wall.

In one such known application, the dike wall is formed of packed earth or concrete and the wall and containment area are thereafter draped with a geo-textile woven fabric sheet over the top of which is sprayed a thermosetting cross-linked polymer material that cures to produce a seamless top skin or liner membrane for trapping any liquid product that should spill or leak from the tanks. The particular top skin polymer material known to be used for this application is sold commercially under the trademark POLYARMOR, by Visuron Technologies, Inc. of Bay City, Mich. Containment systems of this type are permanent installations and thus would not be of practical use in applications where the location of the area to be contained is subject to change, such as at an airport where a mobile fueling truck transports and dispenses fuel to airplanes parked at any of a number of locations. In such situations, it is desirable to contain the area around the fueling vehicle and plane to trap any fuel that may spill during fuel transfer. The walls of such a portable unit need to be collapsible to permit a wheeled vehicle, such as the aforementioned fuel truck and/or plane to be driven or moved into and out of the confinement area over the confinement wall. The walls of the known permanent dike mentioned are not collapsible and hence do not permit the passage of wheeled vehicles thereover without potential damage.

SUMMARY OF THE INVENTION

The invention addresses the shortcomings of the prior stationary confinement systems by providing methods of constructing containment systems and containment systems that are portable and which has containment walls that are elastically deformable. More particularly, a portable liquid spill containment constructed according to a first aspect of the invention includes a liquid-impervious base sheet to which is secured an upstanding, tubular containment wall formed of closed-cell foam that has an elastic memory enabling the wall to recover its original shape after each of repeated deformations, and which defines a liquid spill containment area interiorly within its boundary. Overlying the base sheet and containment wall is a continuous layer of liquid-impervious elastomeric polymer material that unites the base sheet and containment wall and provides a fluid-tight top skin membrane to contain fluid spills.

Because the spill containment is portable, it can be moved to those areas where liquid which needs to be contained is being handled. Once positioned, the closed-cell tubular containment wall permits one or more wheeled vehicles to be driven up over the wall into the containment area. The elastic memory of the closed-cell foam enables the wall to recover its original shape quickly and completely, after it has been deformed, and permits the unit to withstand repeated deformation/recovery cycles without any significant loss of performance.

The closed-cell structure of the foam resists liquid passage when the containment wall inevitably punctures and is exposed to liquid. Punctures or splits in the polymeric top skin are, however, easily repaired.

According to still another aspect of the invention, the portable containment system may be formed with a sump or recess provided within the confinement area at a lower level than the base sheet. Any spilled liquid is directed into the sump to localize and concentrate the liquid which may then be pumped out of the sump to another collection site. The sump thus simplifies the process of removing spilled liquid from the containment area and enables convenient, complete removal of the spilled liquid from the containment.

Other objects and advantages of the invention will become apparent with reference to the accompanying drawings and the accompanying descriptive matter.

THE DRAWINGS

In the drawings, FIG. 1 is a perspective view of a liquid spill containment constructed according to the invention;

FIG. 3 is a fragmentary perspective view of the base layer so formed, shown partly broken away to illustrate its composite structure;

FIG. 4 is a fragmentary sectional elevational view illustrating the intermediate step of forming the upstanding tubular perimetral containment wall in a second jig following removal of the first jig;

FIG. 5 is a fragmentary elevational section view taken on the line 5—5 of FIG. 1;

FIG. 6 is a fragmentary sectional elevational view illustrating a second embodiment of the invention; and FIG. 7 is an enlarged fragmentary sectional elevational view illustrating the construction and installment of the sump.

DETAILED DESCRIPTION

Figure 2:
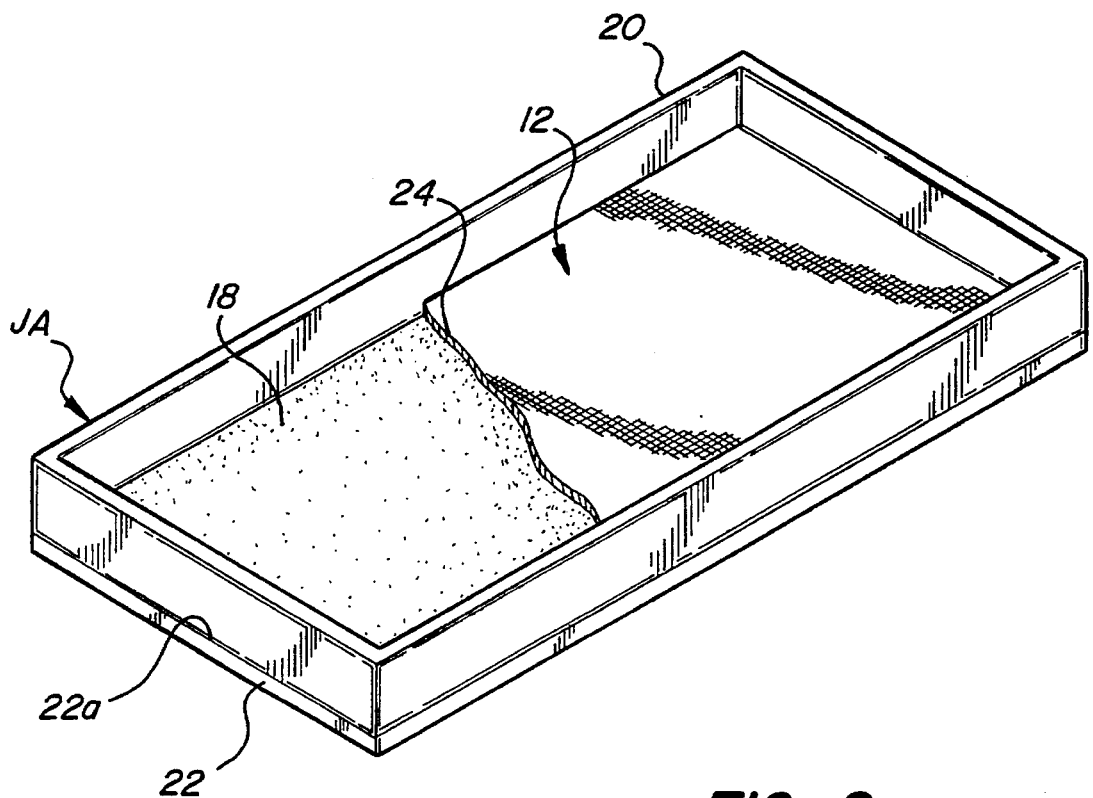
FIG. 2 is a perspective view of the jig assembly for forming the base layer of the containment surface showing the layer in the process of being formed.

A portable liquid spill containment constructed in accordance with the invention is indicated generally by the reference numeral 10 in the drawings and comprises a base sheet shown generally at 12a having a perimetrical edge 14, inset from which is an upstanding, endless, tubular containment wall shown generally at 16 that isolates a containment area A within the confines of its interior boundary. The base sheet 12 has a base layer 18 formed of a liquid-impervious elastomeric polymer material that is resilient, tough, durable, abrasion-resistant, inert to chemicals such as petroleum products, exhibits good adhesion to reinforcement fabrics and foams, is resistant to ultraviolet exposure and oxidation, and exhibits good low temperature flexibility. The preferred material of this type is the previously mentioned thermosetting cross-linked polymer compound sold commercially under the trade mark POLYARMOR, by Visuron Technologies, Inc. of Bay City, Mich. This material may be applied by spraying, rolling, or brushing the material onto a transfer surface. FIG. 2 illustrates the preferred method according to this invention for producing a base layer 12. An upstanding rigid jig assembly JA is provided which includes a jig frame 20 having an inner perimeter corresponding in dimensional size and shape to that of the base layer or sheet that is to be produced, for example, the frame 20 could be rectangular, as shown, and have an inner dimension of 25'×150' or whatever size is necessary to cover the area that is to be protected from fluid spills. The frame 20 is secured on a relatively larger flat support member 22 having an upper transfer surface 22*a* to which the base layer material will not adhere. One suitable support member 22 is a rigid laminated plastic sheet product (i.e. formica) that has been coated with wax. The same wax may be used to coat the interior surfaces of the frame 20.

Once the frame 20 has been positioned, the base layer material is applied, preferably by spraying it on the waxed transfer surface of the support member 22 within the confines of the frame 20 until the desired thickness of the base layer material is developed. A minimum base layer thickness of about 30 mils is required. The preferred base layer material cures in about 15 seconds. Once cured, the base layer 18 per se provides an elastomeric, fluid-impervious membrane that is semi-rigid with a Shore "D" hardness of about 30, a tensile strength of about 1,600 p.s.i., and an elongation factor in the neighborhood of six hundred percent.

Before the base layer material cures, a web of woven fabric 24, or a non-woven, needle punched fabric, that has the same general dimensions as that of the base layer 18 may be placed on the base layer 18 so as to become adhered to the base layer as it cures to provide a composite structure. The fabric web 24 enhances the tensile strength and puncture resistance of the base sheet 12. Some of the types of fabric that may be utilized with good results include woven polyester filaments, needle punched polyester fabric available from Hoechst Celanese Company of North Carolina, fiberglass such as 24 ounce fiberglass roving sold commercially under the trade name ROVCLOTH, polypropylene filaments sold commercially under the trade name MARIFI 500X, polyethylene fabric such as that available from Nicolon Corp. of Norcross, Ga. under product code HS-1150, carbon fiber fabric, and polyamide fabric such as that sold under the trade name KEVLAR. The fiberglass product is presently preferred in forming the base sheet 12.

Once the base layer 18 has cured, the resultant composite base sheet 12 may be peeled free of the support member 12 and inner frame wall 20. One or more hand holds 26 may then be provided in the base sheet 12 by cutting holes into the base sheet 12 at selected spaced locations along its perimetrical edge 14 into which metal eyelets or grommets 28 are installed in any convenient manner. The eyelets 28 may be sufficiently large (e.g., 2½ inches I.D.) to enable a person who wishes to move the containment to grip the eyelets with one or more of his fingers.

The next step in constructing the containment 10 is to position the containment wall 16 on the base sheet 12. The preferred material for the wall 16 is a PVC/nitrile rubber blend, a closed-cell foam product sold commercially under the trade name ENSOLITE. This material has a 100% (or nearly 100%) elastic memory that enables the material to return quickly and fully to original shape after it has been deformed, even after being subjected to repeated deformation/recovery cycles over the expected life of the containment wall 16. The closed-cell structure of this material also makes it resistant to liquid absorption or passage in the event that the wall 16 is punctured or torn during use and is exposed to the containment liquid. Such damage to the containment wall is repaired easily by bonding the torn sections back together with a small quantity of the base layer material described above and overlaying the repaired portions with a coating of the polymer. The preferred closed-cell foam material has a tensile strength of about 30 pounds per square inch, an elastic elongation of about 150%, and exhibits good chemical resistance, particularly to hydrocarbon products such as gasoline and other petroleum fuels.

Figure 1:
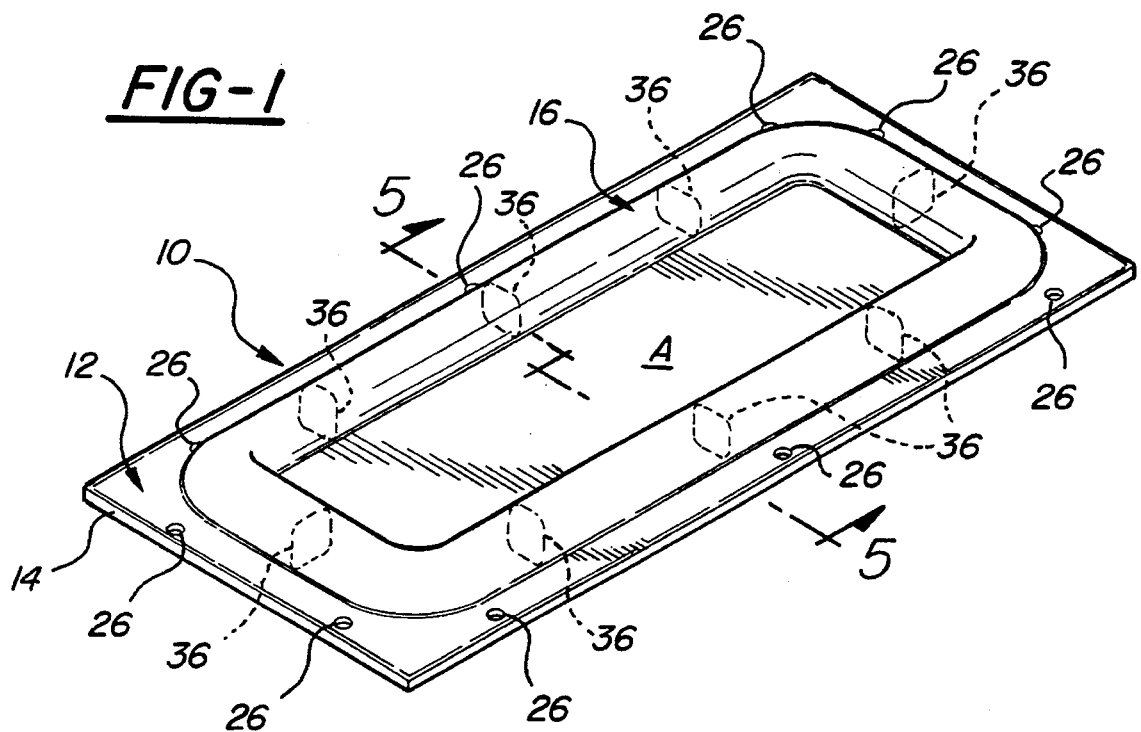

As mentioned, the containment wall is tubular and the closed-cell foam material could be extruded in the tubular configuration shown, but a commercial source for such a product is not known to be available at present. The tubular construction can be made, however, from sheet stock using the method according to this invention that is illustrated in FIG. 4. The sheet stock may be available only in lengths (e.g., 7 feet) that are shorter than the total required perimetrical length of the final containment wall 16, so that the wall may have to be built in sections. The present method involves providing a second rigid frame 30 that is similar in shape to that of the first frame 20, but relatively smaller in size by an amount sufficient to enable the frame 30 to be positioned on the base sheet 12 at a location inset from the perimetrical edge 14 of the base sheet and the handholds 26, as shown in FIG. 4. A tack coat 34 of the base layer material is applied one section at a time to the base sheet 12 inboard of the frame 30 as shown. Before each section of tack coat 32 cures, the associated section of foam sheet stock is placed on the tack coat 32 and folded over upon itself to assume the tubular shape shown in FIG. 4, with the adjoining surfaces of the sheet stock being secured by another tack coat 35 of the same base layer material. Subsequent wall sections may be constructed in the same way and positioned in end-to-end abutting engagement, with their adjacent end wall sections secured by additional tack coat joints 36, as illustrated in phantom in FIG. 1. Also, as shown in FIG. 1, it is preferred that the butt joints 36 not fall at the corners of the containment wall 16, but rather somewhere in between. During construction of the wall 16, the frame 20 serves to position and restrain the wall 16 against outward bowing as the various tack coats cure. A continuous tack coat bead 38 may be applied along the inside perimeter of the wall 16 where it meets the base sheet 12 to further secure the wall 16 in position on the base sheet 12. After the tack coat 38 cures, the frame 30 may be removed and the wall 16 will remain in fabricated position.

FIGS. 5 and 6 illustrate two alternative methods and their resultant structures for completing construction of the containment 10. As shown in the presently preferred embodiment disclosed in FIG. 5, an additional web of woven reinforcing fabric material 40 may be positioned to cover the containment wall 16 and extend over along the base sheet 12 a short distance on either side of the wall 16. It may be secured and positioned by a tack coat layer 42 of the aforementioned base layer material.

The final topcoat of the same polymer material may then be applied, preferably by spraying, over the entire upper exposed surface of the base sheet 12 and containment wall 16 to a minimum thickness of about 60–75 mils and allowed to cure to thereby produce a continuous, monolithic, seamless top skin membrane 44 that extends from the base sheet containment area A up and around the containment wall 16 to the edge 14 of the base sheet 12 to provide a tough, wear-resistant, liquid-impervious cover that unites the base sheet 12 and containment wall 16 and contains any liquids that may be spilled within the containment area A.

The alternative method of completing the containment 10 and its resulting structure is shown in FIG. 6 and is the same as that described in the preceding paragraph, except that the fabric layer 40 and its associated tack coating layer 42 are omitted. However, the same top skin membrane 44 as described above is applied directly to the containment wall 16 and base sheet 12 to provide the same type of cover.

The resultant containment 10 is a portable, self-contained unit that may be dragged, carried, or otherwise transported from one location to another and positioned in an area where liquid to be contained is being handled without requiring modification of the existing area, such as the erection of stationary dike walls as in the installation of permanent liquid spill containments.

An example of a use for the portable containment 10 is at gasoline service stations where it can be positioned in the area where the fuel delivery trucks normally park when filling the underground storage tanks with fuel from the truck. In such an application, the size of the containment 10 would be selected to accommodate preferably the entire liquid-containing tank of the vehicle within the confinement area A. The containment 10 is positioned in the proper area before the truck arrives and the truck is permitted to enter the containment area A by simply driving up and over the containment wall 16. The vehicle wheels, when rolling over the containment wall 16, apply both vertical and lateral compressive loads to the wall 16. The portions of the tubular containment wall 16 engaged by the vehicle wheels yield under the applied load and are substantially flattened so that they are compressed vertically and displaced laterally by the wheels. This lateral displacement is rendered possible because the wall 16 is tubular in configuration. It is further aided by the presence of the exterior space or pocket 45 which is provided perimetrally along the base of the wall 16. The elastic closed-cell character of the containment wall 16 enables the deformed portions of the wall 16 to recover quickly and fully after each of repeated deformations without breaking down or taking a permanent set. The elastic character of the cover layer 44 also allows it to flex under the load of the vehicle wheels and recover its shape after each of repeated deformations. When positioned in the containment area A, any spillage of liquid from the truck will be contained within the confines of the wall 16 and may be cleaned up such as by pumping the liquid out of the containment. To preclude the possibility of fluid escapement past flattened regions of the wall 16, the truck will not be driven up over the wall 16 to exit the containment area until any spilled liquid has been removed.

Another anticipated use for the portable containment unit 10 is at airports where the containment 10 is sufficiently sized to accommodate the mobile refueling truck typically used to refuel planes within the containment area A, as well as all or part of the plane itself. As with the service station example above, the refueling truck and possibly the plane may enter and exit the containment area A simply by driving up and over the containment wall 16. Any fuel spillage will be contained within the containment area A and will be cleaned up in the same manner before permitting the vehicle to exit the containment area. The portable containment 10 may, of course, be used in other applications as well, where liquid to be contained is being handled, and the particular size and shape of the containment 10 will depend on the specific application.

According to another aspect of the invention, a retractable sump, generally indicated at 46, may be incorporated into the construction of either embodiment of the containment described for pooling and holding the remnant of any spilled liquid to facilitate complete clean-up and removal. The sump 46 incorporates a tubular sleeve-like member 48 having an open upper end 50 that is mounted within an opening 52 formed in the base sheet 12 within the confinement area A. The sleeve 48 is closed at its opposite lower end by a rigid or semi-rigid end plate 54 in a manner to define a fluid-tight, sump well 56 which projects below the level of the base sheet 12. The sump may be generally cylindrical in shape with a diameter and height of about 12 inches. The end plate 54 may be fabricated from a rigid PVC plastic material and the sleeve 48 may comprise a flexible, liquid-impermeable PVC sleeve reinforced by an embedded helical metal coil 58 which supports the sleeve radially while permitting the sleeve 48 to expand and contract lengthwisely without stretching. A handle 59 is secured by screws 60 to the end plate 54 within the well 56 to enable the user bodily to contract the sleeve from an extended condition, shown in full lines in FIG. 7, to a relatively shorter length collapsed condition, shown in broken chain lines in FIG. 7. The final top coat layer 44 extends into the interior of the sump sleeve 48 as at 62 to thereby integrate the sump 46 with the base sheet 12 to maintain the seamless, liquid-impervious continuity of the top coat 44 between the base sheet 12 and sump 46 and thereby render the sump fluid tight. An outer layer 64 of the same polymer material is also applied to the exterior surface of the sleeve 48 and end plate 54 to enhance the fluid-tightness, toughness, and durability of the sump 46.

Incorporated into the construction of the sump 46 is a rigid template ring 66 that is embedded in the base sheet 12 between the base layer 18 and fabric 24 and which encircles the base sheet opening 52 to provide the opening with a reinforced lip. The ring may be fabricated of PVC plastic and has a thickness that enables it to be embedded in the base sheet 12 without causing any appreciable increase in overall thickness of the base sheet 12 in the vicinity of the sump 46.

The installation of the sump 46 occurs in part during the making of the base sheet 12 wherein prior to the base layer 18 curing, the template ring 66 is positioned on the base layer 18 where the opening 52 is to be formed for the sump. The ring 66 is embedded into the base layer material as shown and sprayed with a tack coating 68 of the base layer material after which the fabric 24 is laid onto the base layer 18 covering the ring and the base layer material is allowed to cure as before. At some point prior to the application of the final top coat 44, the opening 52 is cut into the base sheet 12, using the inner perimeter of the ring 66 as a guide. Another tack coat 70 is then applied to the fabric 24 around the opening 52 and the open end of the sleeve 48 is extended through the opening 52 from below and draped over the fabric cover ring onto the tack coat 70. The draping of the sleeve material may be facilitated by cutting a plurality of circumferentially spaced longitudinal slits into the open end of the sleeve 48. The end plate 54 will have been secured to the lower end of the sleeve 48 before its attachment to the base sheet 12 by means of a tack coat layer 72 of the same base layer material. Also, the handle 58 will have been attached to the end plate 54 by means of the screws 60 prior to securing the sleeve 48 to the base sheet 12. Once mounted, the outer layer 64 of the base layer material is applied to the exterior surface of the sleeve 48 and end plate 54 and feathered into the base layer 18, as illustrated in FIG. 7. Finally, the top coat 44 is applied as before, except that the thickness of the top coat material is decreased in the vicinity of the ring to maintain the generally uniform thickness of the base sheet 12, and some of the top coat material 62 is sprayed into the interior of the sump to coat the inside surface of the sleeve 48 to thereby unify the sump 46 and the base sheet 12.

A containment having such a sump 46 may be used in much the same way as that described previously, except that, prior to placement of the containment in an area where liquids to be contained are being handled, a recess or hole will be dug to accommodate the sump 46 and allow it to extend below the level of the base sheet 12. When liquid is spilled within the containment area A, the attendant may clean up the spill by guiding the liquid into the sump well 56 with a squeege or other device to concentrate and hold the liquid in one localized region. A conventional immersible-type pump may be introduced into the sump well 56 to pump out the liquid to another suitable containment, prior to the vehicle exiting the containment area A.

To relocate the containment, the attendant may withdraw the sump from the hole in which it was accommodated by grasping the handle 58 and pulling it upwardly to collapse the sleeve 48. The containment may then be transported as before to another selected containment site.

It is to be understood that the embodiments described are exemplary of various forms of the invention only and that the invention is defined in the appended claims which contemplate various modifications within the spirit and scope of the invention.

We claim:

1. In a method of making portable liquid spill containments; the steps of:

a) forming a liquid-impervious base sheet having perimetrical edges;

b) forming an upstanding depressible endless tubular containment wall, formed of an elastic foam with an elastic memory returning it to shape after each of repeated deformations, and positioning said endless wall along the perimetrical edges of said base sheet to isolate a containment area within said containment wall for spills; and c) coating said base sheet and containment wall with a liquid-impervious elastomeric polymer compound fluid and curing it to form a continuous skin layer which extends from said base sheet containment area up over and around said base sheet containment wall and provides a unitary, tough, wear resistant cover.

2. The method of claim 1 wherein said containment wall is adhered to said base sheet in a position inset perimetrically from the said edges of said base sheet, and said skin layer is coated to extend to said perimetrical edges.

3. The method of claim 1 wherein grips are formed on said edges exteriorly of said containment wall.

4. The method of claim 3 wherein the grips are formed by providing openings through said base sheet, and anchoring rigid rings within the openings to provide handholds.

5. The method of claim 1 including forming a dependant sump with a flexible tubular side wall and a bottom wall within the containment area of said base sheet and coating said sump walls with a liquid impervious polymer.

6. The method of claim 5 wherein said sump is produced by:

i) forming a hole in the base sheet;

ii) securing one end of a length of flexible sleeve material to said base sheet around said opening; and iii) closing the opposite end of said sleeve to define a fluid-tight depressed area below said base sheet.

7. A method of making a liquid spill containment, comprising the steps of:

a) applying a curable liquid-impervious fluid elastomeric polymer material to a transfer surface to which it does not adhere to form a base layer sheet with perimetrical edges, and allowing said material to cure;

b) prior to the base layer sheet curing, covering the base layer sheet with a sheet of reinforcement fabric and then allowing said base layer sheet to cure to produce a composite base sheet having perimetrical edges;

c) forming an endless tubular containment wall of closed-cell elastic foam which has an elastic memory that enables the foam material to recover its original shape after each of repeated deformations of the material, and positioning the endless containment wall on the composite base sheet adjacent its perimetrical edges to define a containment area within the interior boundary of the containment wall; and d) coating the base sheet and containment wall with a liquid-impervious elastomeric polymer fluid and allowing the polymer fluid to cure to cover the base sheet and containment wall to produce a continuous, seamless top skin layer that extends from the containment area up and around the containment wall and is impervious to liquid.

8. The method of claim 7 wherein said base layer is formed by spraying the polymer material on said transfer surface.

9. The method of claim 8 wherein, once the base layer polymer material is cured, a rigid hollow frame is positioned on said base sheet and the containment wall is held interiorly within the hollow frame while said wall is secured to the base sheet.

10. The method of claim 9 including removing the said frame after the containment wall is secured to the base sheet and laying down a sheet of reinforcement fabric to extend from the containment area up over the containment wall to exteriorly envelop the containment wall before the coating step of part (c) of claim 1.

11. The method of claim 7 wherein, between steps c) and d), the containment wall is covered with reinforcement fabric sheet material.

12. The method of claim 11 wherein prior to covering the containment wall with the fabric, a tack coating of additional curable liquid-impervious elastomeric material is applied over the containment wall and the fabric is applied over the containment wall before the tack coating cures.

13. A method of making a liquid spill containment, comprising the steps of:

a) forming an upstanding, depressible, endless containment wall of a resilient material having an elastic memory which enables the wall to return to shape after each of repeated deformations;

b) forming a base sheet of liquid-impervious elastomeric polymer material; and c) positioning said containment wall on said base sheet to define a containment area within said containment wall and coating said base sheet, and containment wall with a liquid-impervious elastomeric polymer compound fluid and then curing said compound to form a unitary skin layer which extends from said base sheet containment area up over and around said containment wall to provide a unitary cover.

14. The method of claim 13 wherein a sump having a flexible tubular side wall and a bottom wall is formed and said sump is attached to said base sheet by i) cutting a sump opening in said containment area of the base sheet; and ii) securing of said sump side wall to said base sheet within said opening.

15. The method of claim 14 wherein prior to step i), mounting a rigid template ring to said base sheet in the region where said sump is to be provided, and thereafter forming said opening by cutting away the base sheet material bounded by said template ring.

16. The method of claim 15 wherein the template ring is integrated into the construction of the sump by wrapping and adhering the open end of said sump sidewall around said ring to envelop the latter between said sleeve and said base sheet.

17. A method of making a portable liquid spill containment comprising:

a) forming an upstanding endless containment curb wall from resilient synthetic plastic material having an elastic memory enabling the curb wall to recover its shape after each of repeated deformations; and b) enveloping said curb wall between a liquid impervious base layer polymer sheet and a co-extending continuous seamless skin layer, said skin layer formed by applying and curing an elastomeric polymer fluid layer to said base layer and curb wall, said curb wall bounding and surrounding a containment area formed by said base layer and said skin layer.

18. The method of claim 17 including the step of forming a sump opening in said base layer sheet, forming a sump having a flexible tubular side wall and a bottom wall, affixing said sump to said base layer sheet to register with the sump opening in said base layer sheet, and coating said sump side and bottom walls with the liquid impervious elastomeric polymer fluid layer and permitting said fluid layer to cure.

19. The method of claim 17 wherein said skin layer and base layer are extended perimetrically beyond said curb wall and hand hold openings are cut in said extended portions.

\* \* \* \* \*